(12) United States Patent
Ye et al.

(10) Patent No.: US 11,134,346 B2
(45) Date of Patent: Sep. 28, 2021

(54) BACKLIGHT MODULE AND DISPLAY DEVICE USING THE SAME

(71) Applicant: AU OPTRONICS CORPORATION, Hsin-Chu (TW)

(72) Inventors: Jia-Hong Ye, Hsin-Chu (TW); Cheng-Syun Sie, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 16/991,074

(22) Filed: Aug. 12, 2020

(65) Prior Publication Data
US 2021/0058711 A1 Feb. 25, 2021

(30) Foreign Application Priority Data
Aug. 22, 2019 (TW) .................... 108129988

(51) Int. Cl.
| | | |
|---|---|---|
| *H04R 1/02* | (2006.01) | |
| *H04R 17/00* | (2006.01) | |
| *F21V 8/00* | (2006.01) | |
| *H04R 7/04* | (2006.01) | |

(52) U.S. Cl.
CPC ........... *H04R 17/00* (2013.01); *G02B 6/0011* (2013.01); *H04R 1/028* (2013.01); *H04R 7/04* (2013.01); *H04R 2499/15* (2013.01)

(58) Field of Classification Search
CPC combination set(s) only.
See application file for complete search history.

(56) References Cited

U.S. PATENT DOCUMENTS

| | | | |
|---|---|---|---|
| 7,545,459 B2 | 6/2009 | Fujiwara et al. | |
| 9,398,359 B2* | 7/2016 | Lee | .......... G06F 3/043 |
| 9,729,971 B2 | 8/2017 | Hosoi et al. | |
| 2007/0189560 A1 | 8/2007 | Uenishi et al. | |
| 2010/0134405 A1* | 6/2010 | Park | ...... G02B 6/3522 |
| | | | 345/102 |
| 2016/0005047 A1 | 1/2016 | Polizzotto | |
| 2016/0014525 A1* | 1/2016 | Park | ..... H01L 41/0906 |
| | | | 381/190 |

(Continued)

FOREIGN PATENT DOCUMENTS

| | | |
|---|---|---|
| CN | 1980485 A | 6/2007 |
| CN | 1992999 A | 7/2007 |

(Continued)

OTHER PUBLICATIONS

Taiwan Patent Office, Office action dated May 15, 2020.

*Primary Examiner* — Olisa Anwah
(74) *Attorney, Agent, or Firm* — WPAT, PC

(57) ABSTRACT

A backlight module and display device using the same are provided. The backlight module has a light guide plate. A piezoelectric module is arranged at the outer side of the backside surface of the light guide plate and configured to produce a vibration. The vibration is directly or indirectly transmitted to a resonator, for example, a light guide plate or a bezel, to produce resonance, and a space to which the backside surface is oriented is used as a resonance cavity. By means of the arrangement, the screen-to-body ratio of electronic products and the sound quality can be improved while taking into account the thickness and volume of the electronic products.

24 Claims, 9 Drawing Sheets

(56) References Cited

U.S. PATENT DOCUMENTS

| | | | |
|---|---|---|---|
| 2017/0105294 A1* | 4/2017 | Shimoda | H04B 1/3888 |
| 2018/0081441 A1* | 3/2018 | Pedder | G06F 3/04164 |
| 2018/0101261 A1* | 4/2018 | Mori | G02F 1/133528 |
| 2018/0188895 A1* | 7/2018 | Peng | G06F 3/0433 |
| 2019/0208300 A1* | 7/2019 | Lee | H04R 9/025 |
| 2019/0272075 A1* | 9/2019 | Zhang | G02F 1/133602 |
| 2020/0260191 A1* | 8/2020 | Yin | G02B 6/0065 |

FOREIGN PATENT DOCUMENTS

| | | |
|---|---|---|
| CN | 104282232 | 1/2015 |
| TW | I571133 | 2/2017 |
| TW | M553908 U | 1/2018 |

* cited by examiner

BACKLIGHT MODULE AND DISPLAY
DEVICE USING THE SAME

BACKGROUND OF THE INVENTION

1. Field of the Invention

The present invention generally relates a backlight module and a display device thereof, in particular, a backlight module having sound production component and a display device using the same.

2. Description of the Prior Art

With the development of science and technology, Users of electronic products pay more and more attention to visual experience. Therefore, the screen size and quality of electronic products are continually being improved. Providing larger scale display screen within a limited volume is the current trend. However, when using a configuration of a large screen proportion, the space for arranging other electronic components will be limited. Hence, how to arrange necessary electronic components in an electronic device with large screen proportion has become an issue that must be solved in the development of electronic devices.

When pursuing high screen-to-body ratio, under the condition of no or less increase of the size or thickness of the electronic devices, such as smart phones, the difficulty of arranging electronic components, such as microphone or speaker, will be increased dramatically. For example, in the case of a moving-coil speaker, since its structure and working principle do not allow an effective reduction in its size and thickness, the thickness of the electronic product will be increased in order to contain the speaker and other electronic parts. Therefore, the purpose of the presented invention is to integrate and fit the electronic components, preferably speakers, and the backlight module or the display device, into a limited space without affecting its quality.

SUMMARY OF THE INVENTION

One of the purposes of the presented invention is to provide a backlight module and display device thereof to increase the screen-to-body ratio of electronic products within a limited volume.

One of the purposes of the presented invention is to provide a backlight module and display device thereof to improve sound performance of display devices.

In an embodiment, the presented invention provides a backlight module comprising a light guide plate and a first piezoelectric module. The light guide plate has a light exit surface and a backside surface, wherein the light exit surface is opposite to the backside surface. The first piezoelectric module is arranged at the outer side of the backside surface and configured to produce a first vibration. Wherein the first vibration is directly or indirectly transmitted to the light guide plate to produce a resonance, and a space to which the backside surface is oriented is used as a first resonance cavity.

In an embodiment, the presented invention provides a backlight module comprising a light guide plate, a bezel and a piezoelectric module. The light guide plate has a light exit surface and a backside surface, wherein the light exit surface is opposite to the backside surface. The bezel is arranged at the outer side of the backside surface. The bezel has an inner surface and an outer surface opposite to each other, wherein the inner surface faces the backside surface, and the outer surface has a convex part. The piezoelectric module is arranged on the convex part and configured to produce a vibration. Wherein the vibration is directly or indirectly transmitted to the bezel to produce a resonance, and a space to which the outer surface is oriented is used as a resonance cavity.

In an embodiment, the presented invention provides a backlight module comprising a light guide plate and a first piezoelectric module. The light guide plate has a light exit surface and a backside surface, wherein the light exit surface is opposite to the backside surface. The first piezoelectric module is arranged at the outer side of the light exit surface and configured to produce a vibration. Wherein the vibration is directly or indirectly transmitted to the light guide plate to produce a resonance, and a space to which the backside surface is oriented is used as a resonance cavity.

In an embodiment, the presented invention provides a display device comprising the presented backlight module.

Accordingly, using the presented backlight module and display device can effectively configure electronic components. Therefore, the screen-to-body ratio of electronic products can be increased and the sound performance of display devices can be improved.

DETAILED DESCRIPTION OF THE
PREFERRED EMBODIMENT

The connecting elements according to the present invention will be described in detail below through embodiments and with reference to the accompanying drawings. A person having ordinary skill in the art may understand the advantages and effects of the present disclosure through the contents disclosed in the present specification.

It should be understood that, even though the terms such as "first", "second", "third" may be used to describe an element, a part, a region, a layer and/or a portion in the present specification, but these elements, parts, regions, layers and/or portions are not limited by such terms. Such terms are merely used to differentiate an element, a part, a region, a layer and/or a portion from another element, part, region, layer and/or portion. Therefore, in the following discussions, a first element, portion, region, layer or portion may be called a second element, portion, region, layer or portion, and do not depart from the teaching of the present disclosure.

The terms "comprise", "include" or "have" used in the present specification are open-ended terms and mean to "include, but not limit to."

Unless otherwise particularly indicated, the terms, as used herein, generally have the meanings that would be commonly understood by those of ordinary skill in the art. Some terms used to describe the present disclosure are discussed below or elsewhere in this specification to provide additional guidance to those skilled in the art in connection with the description of the present disclosure.

Figure 1:
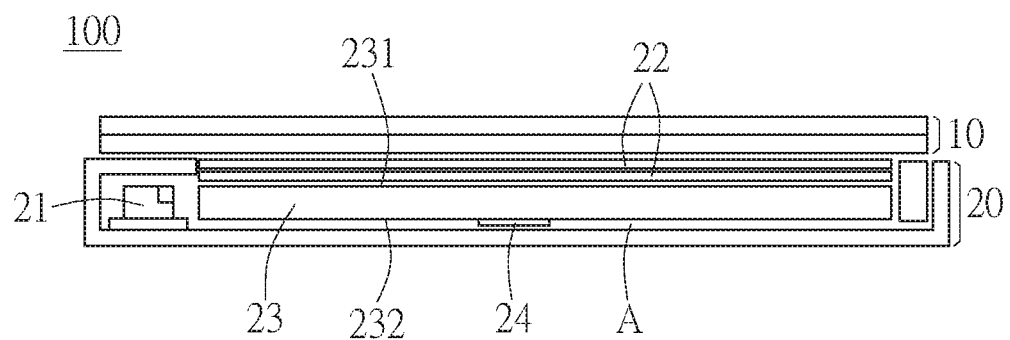
FIG. 1 is a cross-section view of the backlight module and display device thereof according to an embodiment of the present invention.

The presented invention provides a backlight module and a display device comprising the backlight module. FIG. 1 is a schematic view of the display device according to an embodiment. Refer to FIG. 1. The display device 100 comprises two parts. One part is the display panel 10 and the other part is the backlight module 20. The display pane 110 and the backlight module 20 can be integrated into a display device using a case. More specifically, the backlight module 20 provides illuminating light, and the illuminating light is, for example, polarized or adjusted by liquid panels of the display panel 10 and flited by color filters to form image light. By using the backlight module, electronic components, especially speakers, can be effectively integrated into the display device, and the screen-to-body ratio of products can be increased without affecting the thickness and total volume of products with high display demand, such as mobile phones or laptops.

As shown in FIG. 1, the backlight module 20 comprises the light source 21, the optical film 22, the light guide plate 23 and the first piezoelectric module 24. The light guide plate 23 has the light exit surface 231 and the backside surface 232, wherein the light exit surface 231 is opposite to the backside surface 232. It should be noted that the material of the light guide plate 23 can be plastic, glass or composite materials. The illuminating light provided by the light source 21 enters a light entering side of the light guide plate 23 (e.g., the side of the light guide plate 23), and exits from the light exit surface 231 through the total reflection property of the media in the light guide plate 23. The first piezoelectric module 24 is arranged at the outer side of the backside surface 232 and configured to produce a vibration. Preferably, the frequency of the vibration is in a range that can be heard by human, such as 20-20000 Hz. In the embodiment, the first piezoelectric module 24 can be directly attached to the backside surface 232 to transmit the vibration directly to the light guide plate 23. Nevertheless, in other embodiments, the first piezoelectric module 24 can also be attached to a plate or material arranged on the outer side of the backside surface 232 to transmit the vibration indirectly to the light guide plate 23 to produce a resonance. Wherein the vibration is directly or indirectly transmitted to the light guide plate 23 to produce a resonance with the light guide plate 23, and the space A to which the backside surface 232 is oriented is used as a resonance cavity. It should be noted that FIG. 1 is only a simplified description, hence it only shows one piezoelectric module (the first piezoelectric module 24). However, the presented invention is not limited by the number of the first piezoelectric modules. The presented invention can arrange a plurality of first piezoelectric modules. With this arrangement, the speaker can be arranged in a thin space located at the backside of the display device without affecting the display performance of the display device. Furthermore, the screen-to-body ratio can also be increased by this arrangement.

Figure 2A:
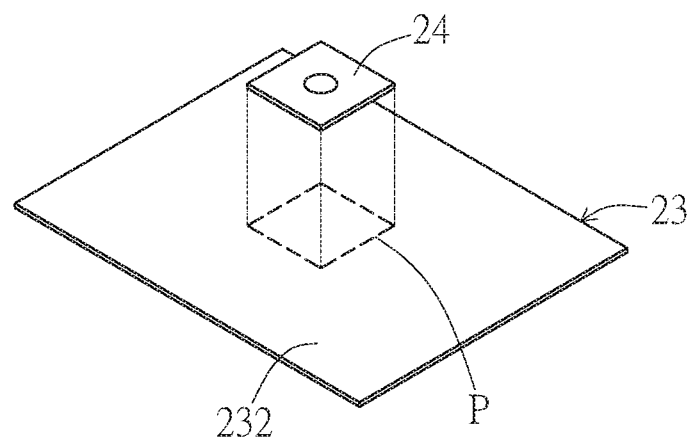
FIG. 2A is a schematic view of the scope of arrangement of the piezoelectric module.
Figure 2B:
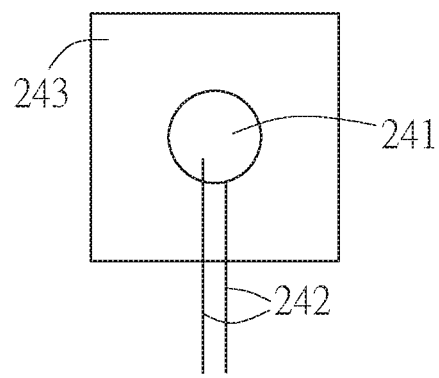
FIG. 2B is the top view of the structure of the piezoelectric module.
Figure 2C:
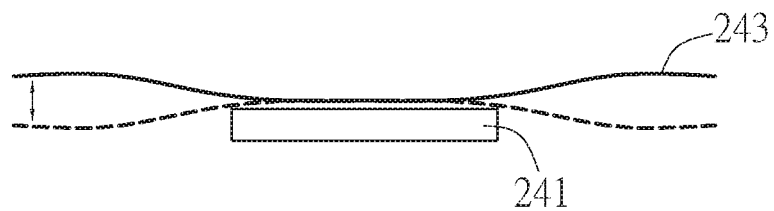
FIG. 2C is a schematic view of the vibration action of the membrane of the piezoelectric module.

Refer to FIG. 2A. FIG. 2A shows the arrangement of the first piezoelectric module 24 and the light guide plate 23. More specifically, the vertical projection area P of the first piezoelectric module 24 projected on the backside surface 232 of the light guide plate 23 will not exceed the boundary of the light guide plate 23. In addition, refer to FIG. 2B. The first piezoelectric module 24 can further comprise, for example, the piezoelectric layer 241 and the electrode 242. The piezoelectric layer 241 produces the piezoelectric effect, a transformation between electrical energy and mechanical energy, by applying electrical power from the electrode 242 to produce a vibration. The material of the piezoelectric layer 241 can be piezoelectric ceramics, such as PZT, or piezoelectric polymers. In an embodiment, the piezoelectric layer 241 is directly attached to the backside surface 232 of the light guide plate 23. Through the vibration frequency of the piezoelectric layer 241, it matches and resonates with the light guide plate 23. Wherein the piezoelectric layer 241 can be a mono-layered or multi-layered structure. The frequency response of the piezoelectric layer 241 can be adjusted by changing the composition of the layers of the piezoelectric layer 241 to fit the needed vibration frequency to produce resonance with the light guide plate 23. The piezoelectric module 24 can comprise, for example, a vibration membrane 243 made of metal sheet, cotton or rubber, but not limited thereto. As shown in FIG. 2C, the vibration produced by the piezoelectric layer 241 can drive the vibration membrane 243. The vibration membrane 243 can transmit the vibration to the light guide plate 23. In addition, the vibration membrane 243 can adjust the timbre of sounds produced by the vibration from the piezoelectric layer 241 while the piezoelectric layer 241 is powered.

Figure 3A:
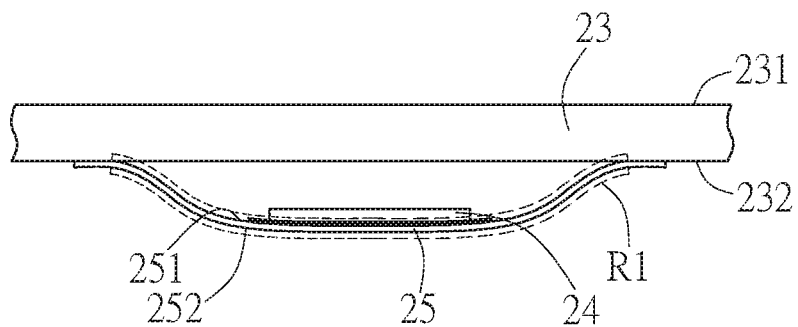
FIG. 3A and FIG. 3B are cross-section views of arranging a membrane on the light guide plate according to an embodiment of the present invention.
Figure 3B:
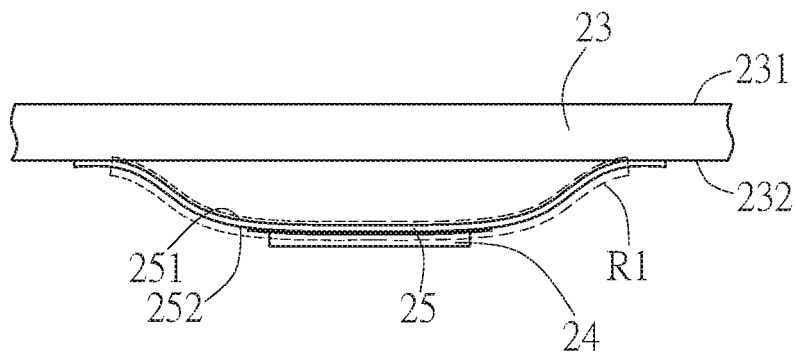

FIG. 3A shows a cross-section view of the backlight module according to an embodiment. As shown in FIG. 3A, the backlight module 20 can further comprise the first membrane 25. The first membrane 25 is at least partially attached to the backside surface 232 and forms the first vibration portion R1. Preferably, the edge of the first membrane 25 can be attached to the backside surface 232 to allow the middle portion of the first membrane 25 to vibrate up and down to form the first vibration portion R1. More specifically, in the embodiment shown in FIG. 3A, the first piezoelectric module 24 can be arranged on the side 251 of the first vibration portion R1 of the first membrane 25 facing the light guide plate 23. As shown in FIG. 3A, the vibration produced by the first piezoelectric module 24 is transmitted to the light guide plate 23 via the first vibration portion R1. On the other hand, in another embodiment shown in FIG. 3B, the first piezoelectric module 24 can be arranged on the side 252 of the first vibration portion R1 of the first membrane 25 opposite the light guide plate 23; that is, it can be arranged on the outer side of the first vibration portion R1. After the first piezoelectric module 24 produces the vibration, the vibration is transmitted indirectly to the light guide plate 23 via the first membrane 25 and the first vibration portion R1.

Figure 4:
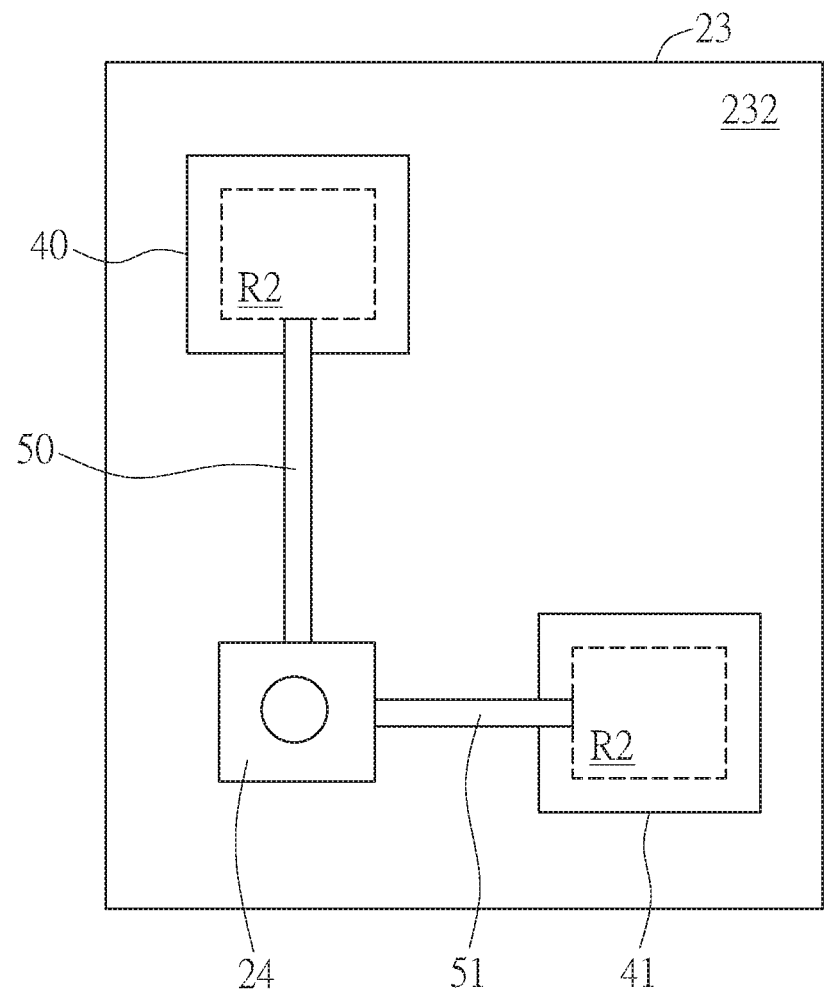
FIG. 4 is a schematic view of using the vibration-guiding unit according to an embodiment of the present invention.

In different embodiments, one can use a connection-transmission method to transmit the vibration produced by the first piezoelectric module 24 to another site and use such site to make the light guide plate 23 produce resonance. Refer to FIG. 4. In the embodiment shown in FIG. 4, the backlight module 20 comprises the second membrane 40 and the vibration-guiding unit 50. The second membrane 40 is arranged on the backside surface 232 and has the second vibration portion R2. Preferably, the edge of the second membrane 40 can be attached to the backside surface 232 of the light guide plate 23 to cause the middle portion of the second membrane 40 to vibrate up and down and forms the second vibration portion R2 between the second membrane 40 and the backside surface 232 of the light guide plate 23. Wherein the second vibration portion R2 and the first piezoelectric module 24 do not overlap. More specifically, as shown in FIG. 4, the projection area of the second vibration portion R2 projected on the backside surface 232 of the light guide plate 23 does not overlap with the first piezoelectric module 24. The structure of the vibration-guiding unit 50 can be a strip form or tube form. The vibration-guiding unit 50 is connected between the first piezoelectric module 24 and the second vibration portion R2. One end of the vibration-guiding unit 50 is connected to the first piezoelectric module 24 and receives the vibration. The other end of the vibration-guiding unit 50 is connected to the second vibration portion R2 and transmits the vibration to the second vibration portion R2 via the vibration-guiding unit 50 to produce resonance at the second vibration portion R2 of the light guide plate 23.

Regarding the membrane, the materials of the first membrane 25 and the second membrane 40 can be but not limited to metal sheets, cottons, rubbers or nonwoven fabrics. The material of the first membrane 25 can be the same as or different from the material of the second membrane 40. By placing the first membrane 25 and the second membrane 40, the vibration produced by the first piezoelectric module 24 can be transmitted to a target site. In addition, in different embodiments, the vibration produced by the first piezoelectric module 24 or transmitted via the vibration-guiding unit 50 can be adjusted by the parameters, such as the material or size, of the first membrane 25 and the second membrane 40 to make the frequency of the vibration match with the natural frequency of the light guide plate 23 so that resonance can be produced more easily. In addition, the material of the vibration-guiding unit 50 can be the same as or different from the material of the first membrane 25 and/or the material of second membrane 40. More specifically, the vibration-guiding unit 50 and the second membrane 40 can be a unibody or formed by different material.

Furthermore, the vibration produced by the first piezoelectric module 24 can be transmitted via a plurality of second membranes. As shown in FIG. 4, a plurality of second membranes, 40 and 41, are respectively arranged on different regions of the backside surface 232 of the light guide plate 23 to form different second vibration regions R2. Each of the second vibration regions R2 is respectively connected to the first piezoelectric module 24 via the vibration-guiding unit 50 and the vibration-guiding unit 51. In this embodiment, the second membranes 40 and 41 and the first piezoelectric module 24 do not overlap. The vibration produced by the first piezoelectric module 24 can be transmitted to the second membranes 40 and 41 via the vibration-guiding units 50 and 51 and produce resonance at each of the second vibration regions R2. Through this arrangement, the position of the backlight module and the sounds and/or resonances produced can be controlled or adjusted to achieve desired sound performance.

Figure 5A:
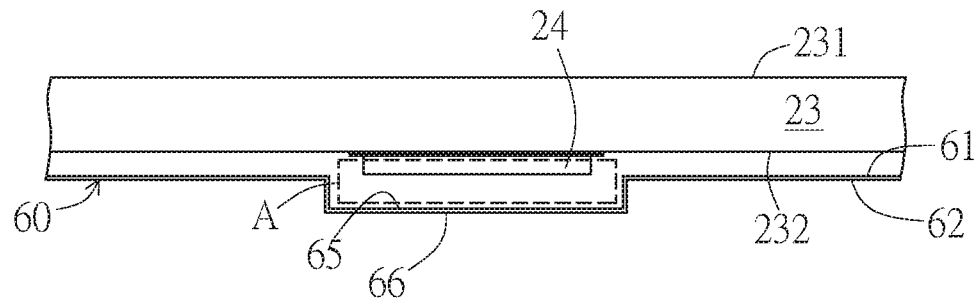
FIG. 5A is a cross-section view of the backlight module according to an embodiment of the present invention.

FIG. 5A shows an embodiment of the backlight module 20. As shown in FIG. 5A, the backlight module 20 further comprises the bezel 60. The material of the bezel 60 can be metal, such as aluminum, or plastic. The bezel 60 is arranged at the outer side of the backside surface 232 of the light guide plate 23 and has the inner surface 61 facing the light guide plate 23. The inner surface has the concave part 65 to form the accommodation space A. The concave part 65 can be formed by metal processing technologies, such as embossing the bezel 60. Therefore, the convex part 66 is formed at the position of the outer surface 62 corresponding to the concave part 65. However, in different embodiments, the concave part 65 can be formed by other procedures, such as milling the concave part 65 on bezel 60, without forming the convex part 66 at the position of the outer surface 62 corresponding to the concave part 65. The first piezoelectric module 24 or a portion of the first piezoelectric module 24 can be arranged at the accommodation space A. The vertical projection of the first piezoelectric module 24 projected on the backside surface 232 overlaps the projection of the accommodation space A projected on the backside surface 232. More specifically, the accommodation space A can be a resonance cavity for the vibration produced by the first piezoelectric module 24 to adjust or control the parameters, such as frequency, tone or volume, of the sound produced by the first piezoelectric module 24.

Figure 5B:
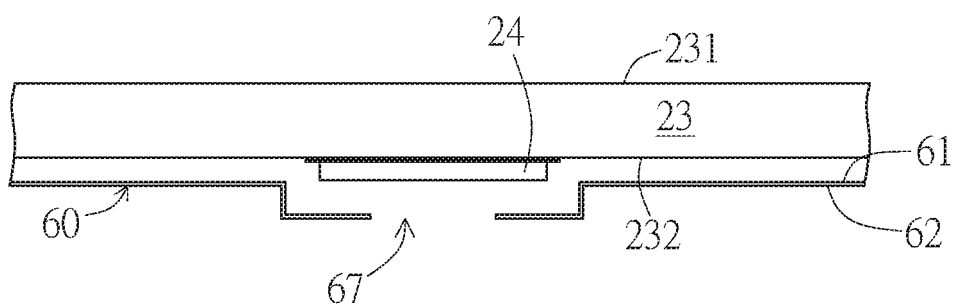
FIG. 5B is a cross-section view of the bezel having an opening according to an embodiment of the present invention.

FIG. 5B shows another embodiment of the concave part 65 formed on the bezel 60. Refer to FIG. 5B. The bottom portion of the concave part 65 has the opening 67. The vibration produced by the first piezoelectric module 24 or the resonance produced by the light guide plate 23 can be transmitted outside of the bezel 60 via the opening 67. The space outside the opening 67 can be a resonance cavity. For example, a case can be arranged at the outside of the bezel, and the space formed between the case and the bezel 60 can be the resonance cavity for the vibration transmitted via the opening 67.

Figure 6A:
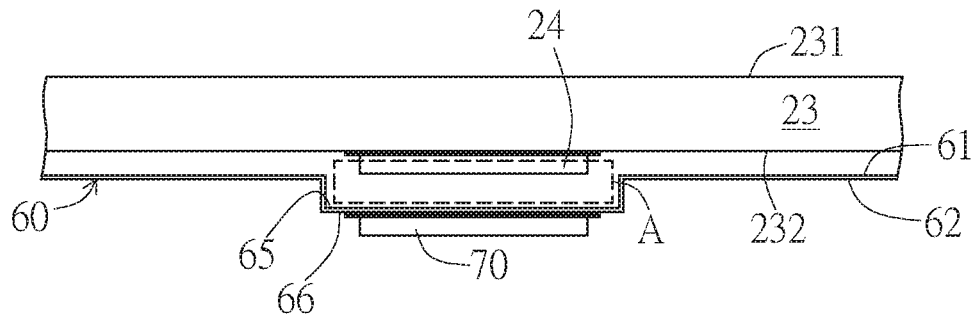
FIG. 6A and FIG. 6B are cross-section views of arranging the second piezoelectric module according to an embodiment of the present invention.
Figure 6B:
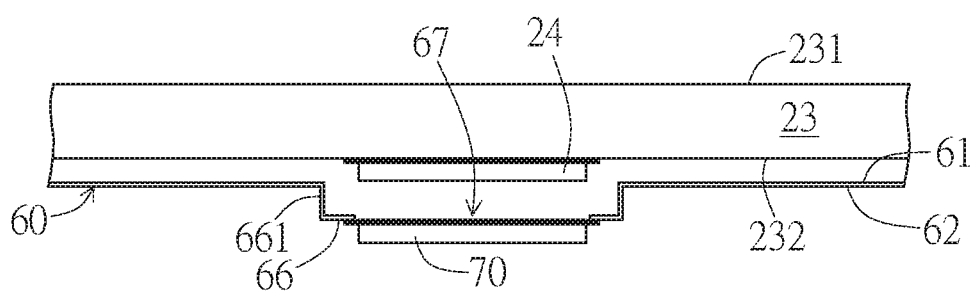

To supply various sound qualities, such as frequencies or volumes but not limited to, the backlight module 20 of the present invention can further comprise another piezoelectric module. FIG. 6A shows an embodiment of the backlight module 20 which further comprises the second piezoelectric module 70. Wherein the bezel 60 has the outer surface 62 opposite to the inner surface 61. The portion of the outer surface 62 corresponding to the concave part 65 has the convex part 66. As mentioned before, the concave part 65 can be formed by metal processing technologies, such as embossing the bezel 60. More specifically, if the thickness of the bezel 60 is less than the thickness of the first piezoelectric module 24, since the first piezoelectric module 24 is arranged in the accommodation space A, the convex part 66 opposite to the concave part 65 will be formed to accommodate the first piezoelectric module 24 when forming the accommodation space A, but the reason to create the convex part 66 is not limited to the aforementioned reason. The second piezoelectric module 70 can be arranged on the outer surface 62 of the bezel 60. More specifically, the second piezoelectric module 70 can be arranged on the convex part 66 of the outer surface 62. It should be noted that the first piezoelectric module 24 and the second piezoelectric module 70 can be of the same or different specifications, selected according to the purpose. In addition, the number of the second piezoelectric module 70 is not limited to one. The number of the second piezoelectric module 70 can be plural.

However, the position for arrangement of the second piezoelectric module 70 is not limited to the outer surface 62 of the bezel 60. In an embodiment shown in FIG. 6A, the convex part 66 has the sidewall 661. The sidewall 661 is formed with an opening 67. The second piezoelectric module 70 is arranged in the opening 67 and connected to the sidewall 661. By the arrangement, the function of the sidewall 661 is similar to the function of the membrane which is transmitting vibration and/or adjusting the parameters of the vibration. It should be noted that the position for arrangement of the second piezoelectric module 70 is not limited to aforementioned embodiment. The second piezoelectric module 70 can be arranged at any proper space or position on the backside surface 232 of the light guide plate 23.

Figure 7:
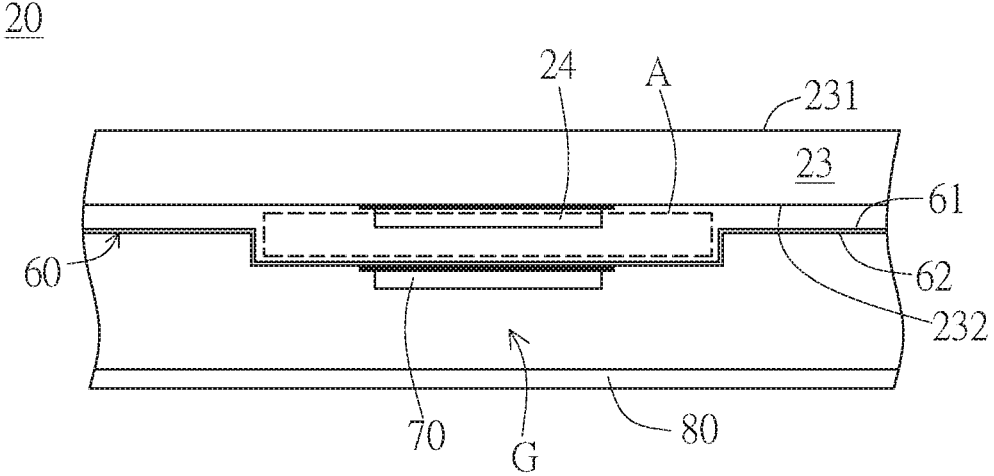
FIG. 7 is a cross-section view of the backlight module having a case according to an embodiment of the present invention.

FIG. 7 shows an embodiment of the backlight module. As shown in FIG. 7, the backlight module 20 further comprises the case 80 arranged at the outer side of the outer surface 62 of the bezel 60. The gap G is formed between the case 80 and the bezel 60. The second piezoelectric module 70 produces the second vibration to cause the bezel 60 to produce resonance, and the gap G is used as a resonance cavity. More specifically, the material of the case 80 can be metal, such as aluminum, or plastic and configured to protect the components or to form the gap G so that a resonance cavity exists for the resonance produced by the second piezoelectric module 70 with the bezel 60. Through this arrangement, the first piezoelectric module 24 and the second piezoelectric module 70 can produce resonance using different resonance cavities. However, the first piezoelectric module 24 and the second piezoelectric module 70 are not limited to using different resonance cavities; they may also use the same resonance cavity. For example, a cavity may have spaces of different widths to allow vibrations of different wavelengths to have the same resonance cavity, but is not limited thereto.

In addition, in an embodiment, at least one hole can be formed on the case 80. The hole is configured to transmit the vibration to the outside of the case 80. In addition, membrane(s) or vibration-guiding unit(s) can be arranged between the first piezoelectric module 24 or the second piezoelectric module 70 and the case 80 to make the transmission of the vibration easier.

Figure 8A:
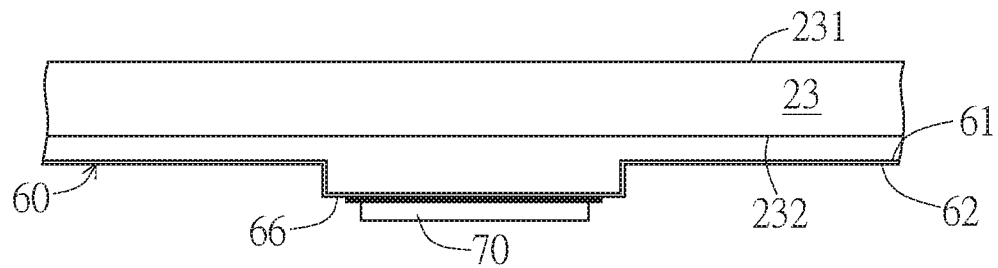
FIG. 8A and FIG. 8B are cross-section views of the backlight module according to an embodiment of the present invention.
Figure 8B:
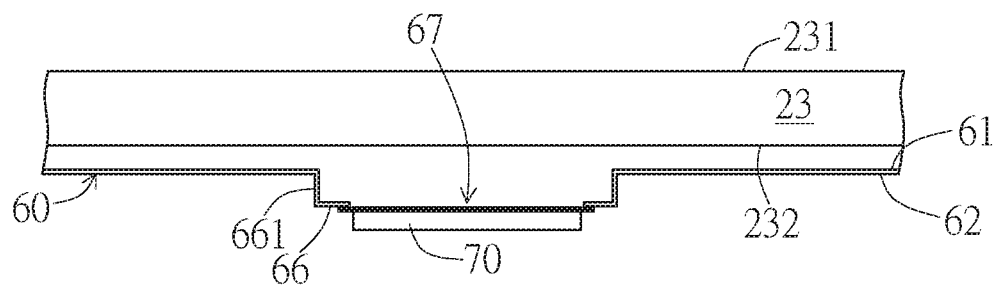

FIG. 8A shows the backlight module according to an embodiment. Different from the aforementioned embodiments, the backlight module of the embodiment does not have the first piezoelectric module 24 arranged at the outer side of the backside surface 231 of the light guide plate 23. However, the backlight module of the embodiment is similar to the aforementioned embodiments that the piezoelectric module is arranged at the outer side of the backside surface 231 of the light guide plate 23 to produce a vibration. The vibration is directly or indirectly transmitted to a resonator, such as the light guide plate 23 or the bezel, to produce resonance, and use the outside space to which the backside surface is oriented as the resonance cavity. As shown in FIG. 8A, the backlight module 90 comprises the light guide plate 23, bezel 60 and the second piezoelectric module 70. The light guide plate 23 has the light exit surface 231 and the backside surface 232. Wherein the light exit surface 231 is opposite to the backside surface 232. The bezel 60 is arranged at the outer side of the backside surface 232 and has the inner surface 61 and outer surface 62. Wherein the inner surface 61 is opposite to the outer surface 62 and faces the backside surface 232. The outer surface 62 has the convex part 66. The second piezoelectric module 70 is arranged on the convex part 66 and configured to produce a vibration. Wherein the vibration is directly or indirectly transmitted to the bezel 60 to produce resonance. The space to which the outer surface 62 is oriented is used as a resonance cavity. However, the position for arranging the second piezoelectric module 70 is not limited to in the convex part 66 of the outer surface 62 of the bezel 60. The embodiment shown in FIG. 8B is another example of the arrangement of the second piezoelectric module 70. As shown in FIG. 8B, the convex part 66 has the sidewall 661. An end of the sidewall 661 forms the opening 67. The second piezoelectric module 70 is arranged in the opening 67 and connected to the end formed the opening. The vibration produced by the second piezoelectric module 70 can be transmitted to the bezel 60 via the sidewall 661.

Figure 9:
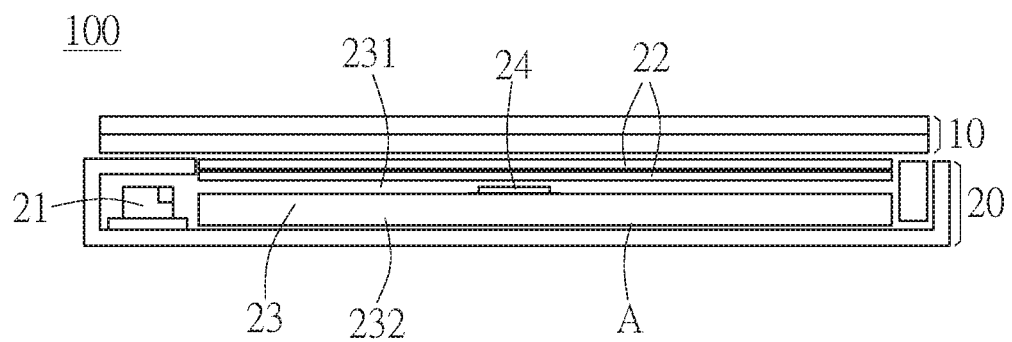
FIG. 9 is a cross-section view of the backlight module according to an embodiment of the present invention.
Figure 10:
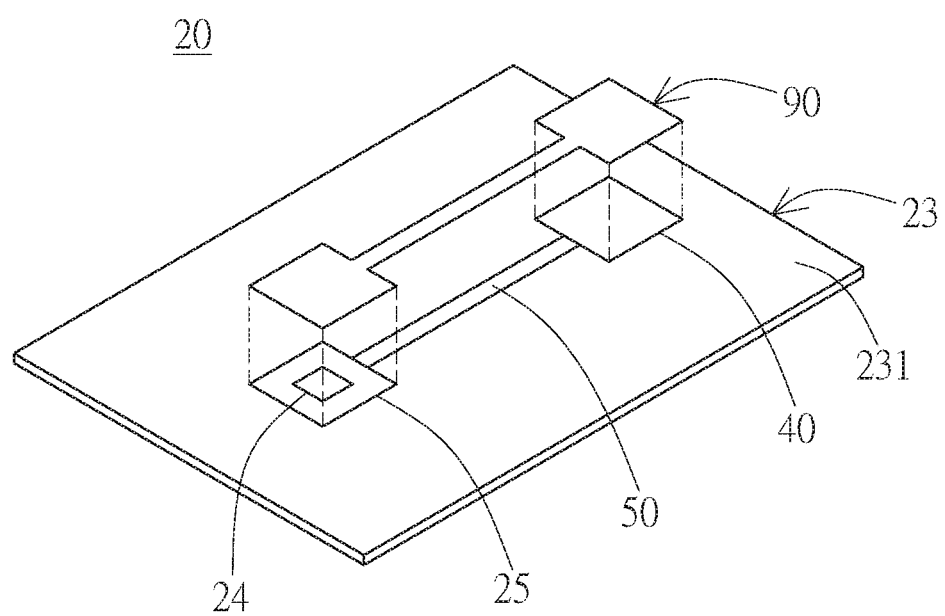
FIG. 10 is a schematic view of arranging an optical reflector according to an embodiment of the present invention.

FIG. 9 shows the backlight module 20 according to an embodiment. The backlight module 20 comprises the light guide plate 23 and the first piezoelectric module 24. The light guide plate 23 has the light exit surface 231 and the backside surface 232. Wherein the light exit surface 231 is opposite to the backside surface 232. The first piezoelectric module 24 is arranged at the outer side of the light exit surface 231 and configured to produce a vibration. Wherein the vibration is directly or indirectly transmitted to the light guide plate 23 to produce resonance, and the space to which the backside surface 232 is oriented is used as a resonance cavity. Furthermore, the first membrane 25, the second membrane 40 or the vibration-guiding unit 50 can be arranged between the first piezoelectric module 24 and the light guide plate 23. The working mechanism of the embodiment is similar to aforementioned embodiments. In addition, referring to FIG. 10, the backlight module 20 further comprises the optical reflector 90 arranged on the first piezoelectric module 24 and overlapping the first piezoelectric module 24. More specifically, the projection area of the first piezoelectric module 24 projected on the light exit surface 231 is within the region of projection of the optical reflector 90 projected on the light exit surface 231. If the first membrane 25, the second membrane 40 or the vibration-guiding unit 50 is/are arranged on the light exit surface 231, the optical reflector 90 will be arranged on top of the first membrane 25, the second membrane 40 or the vibration-guiding unit 50 and overlap them. The optical reflector 90 is configured to reflect the light illuminated on the first piezoelectric module 24, the first membrane 25 the second membrane 40 or the vibration-guiding unit 50. The light may be but not limited to the light illuminated from the display pane 110 or the optical film arranged between the light guide plate 23 and the display panel 10. This arrangement allows the first piezoelectric module 24, the first membrane 25 the second membrane 40 or the vibration-guiding unit 50 which are on the light exit surface 231 to be hard to observe by the user.

Although the present invention discloses the aforementioned embodiments, it is not intended to limit the invention. Any person who is skilled in the art in connection with the present invention can make any change or modification without departing from the spirit and scope of the present invention. Therefore, the scope of protection of the present invention should be determined by the claims in the application.

What is claimed is:

1. A backlight module, comprising:
    a light guide plate having a light exit surface and a backside surface, wherein the light exit surface is opposite to the backside surface; and
    a first piezoelectric module arranged at an outer side of the backside surface and configured to produce a first vibration, wherein the first vibration is directly or indirectly transmitted to the light guide plate and caused the light guide plate to produce a resonance, and a space to which the backside surface is oriented is used as a first resonance cavity.

2. The backlight module of claim 1, further comprising a first membrane at least partially attached to the backside surface to form a first vibration portion, wherein the first piezoelectric module is arranged on a side of the first vibration portion facing the backside surface; the first vibration is transmitted to the light guide plate via the first vibration portion.

3. The backlight module of claim 1, further comprising a first membrane at least partially attached to the backside surface to form a first vibration portion, wherein the first piezoelectric module is arranged on a side of the first vibration portion opposite to the backside surface; the first vibration is transmitted to the light guide plate via the first vibration portion.

4. The backlight module of claim 1, further comprising:
a second membrane arranged on the backside surface and forming a second vibration portion, wherein the second vibration portion and the piezoelectric module do not overlap with each other; and
a vibration-guiding unit connected between the first piezoelectric module and the second vibration portion, wherein the vibration-guiding unit receives the first vibration from the first piezoelectric module and transmits the first vibration to the second vibration portion to cause the light guide plate to resonate with the second vibration portion.

5. The backlight module of claim 1, further comprising:
a bezel arranged at the outer side of the backside surface, the bezel having an inner surface, the inner surface having a concave part configured to form an accommodation space, wherein the first piezoelectric module is arranged corresponding to the accommodation space.

6. The backlight module of claim 5, wherein the concave part is formed with an opening; the first vibration is transmitted outside of the bezel via the opening.

7. The backlight module of claim 5, further comprising:
a second piezoelectric module,
wherein the bezel has an outer surface opposite to the inner surface; a convex part forms on the outer surface opposite to the concave part; the second piezoelectric module is arranged on the outer surface corresponding to the convex part.

8. The backlight module of claim 7, further comprising:
a case arranged at an outer side of the outer surface of the bezel, a gap formed between the case and the bezel,
wherein the second piezoelectric module is configured to produce a second vibration to cause the bezel to produce resonance, and the gap is used as a second resonance cavity.

9. The backlight module of claim 7, wherein the convex part has a sidewall; the sidewall is formed with an opening; the second piezoelectric module is arranged corresponding to the opening and connected to the sidewall.

10. A backlight module, comprising:
a light guide plate having a light exit surface and a backside surface, wherein the light exit surface is opposite to the backside surface;
a bezel arranged at an outer side of the backside surface, the bezel having an inner surface and an outer surface opposite to each other, wherein the inner surface faces the backside surface, and the outer surface has a convex part; and
a piezoelectric module arranged on the convex part and configured to produce a vibration,
wherein the vibration is directly or indirectly transmitted to the bezel to produce a resonance, and a space to which the outer surface oriented is used as a resonance cavity.

11. The backlight module of claim 10, wherein the convex part has a sidewall; the sidewall is formed with an opening; the piezoelectric module is arranged corresponding to the opening and connected to the sidewall, and the vibration is transmitted to the bezel via the sidewall.

12. A backlight module, comprising:
a light guide plate having a light exit surface and a backside surface, wherein the light exit surface is opposite to the backside surface; and
a first piezoelectric module arranged at an outer side of the light exit surface and configured to produce a vibration,
wherein the vibration is directly or indirectly transmitted to the light guide plate and caused the light guide plate to produce a resonance, and a space to which the backside surface is oriented is used as a resonance cavity.

13. The backlight module of claim 12, further comprising a reflector arranged on the first piezoelectric module and overlapped with the first piezoelectric module, wherein the reflector is configured to reflect light illuminating to the first piezoelectric module.

14. A display device comprising:
a backlight module, comprising:
a light guide plate having a light exit surface and a backside surface, wherein the light exit surface is opposite to the backside surface; and
a first piezoelectric module arranged at an outer side of the backside surface and configured to produce a first vibration,
wherein the first vibration is directly or indirectly transmitted to the light guide plate and caused the light guide plate to produce a resonance, and a space to which the backside surface is oriented is used as a first resonance cavity.

15. The display device of claim 14, wherein the backlight module further comprises a first membrane at least partially attached to the backside surface to form a first vibration portion, wherein the first piezoelectric module is arranged on a side of the first vibration portion facing the backside surface; the first vibration is transmitted to the light guide plate via the first vibration portion.

16. The display device of claim 14, wherein the backlight module further comprises a first membrane at least partially attached to the backside surface to form a first vibration portion, wherein the first piezoelectric module is arranged on a side of the first vibration portion opposite to the backside surface; the first vibration is transmitted to the light guide plate via the first vibration portion.

17. The display device of claim 14, wherein the backlight module further comprises:
a second membrane arranged on the backside surface and forming a second vibration portion, wherein the second vibration portion and the piezoelectric module do not overlap with each other; and
a vibration-guiding unit connected between the first piezoelectric module and the second vibration portion, wherein the vibration-guiding unit receives the first vibration from the first piezoelectric module and transmits the first vibration to the second vibration portion to cause the light guide plate to resonate with the second vibration portion.

18. The display device of claim 14, wherein the backlight module further comprises a bezel arranged at the outer side of the backside surface, the bezel having an inner surface, the inner surface having a concave part configured to form an accommodation space, wherein the first piezoelectric module is arranged corresponding to the accommodation space.

19. The display device of claim 18, wherein the concave part is formed with an opening; the first vibration is transmitted outside of the bezel via the opening.

20. The display device of claim 18, wherein the backlight module further comprises:
a second piezoelectric module,
wherein the bezel has an outer surface opposite to the inner surface; a convex part forms on the outer surface opposite to the concave part; the second piezoelectric module is arranged on the outer surface corresponding to the convex part.

21. The display device of claim 20, wherein the backlight module further comprises:
a case arranged at an outer side of the outer surface of the bezel, a gap formed between the case and the bezel,
wherein the second piezoelectric module is configured to produce a second vibration to cause the bezel to produce resonance, and the gap is used as a second resonance cavity.

22. The display device of claim 20, wherein the convex part has a sidewall; the sidewall is formed with an opening; the second piezoelectric module is arranged corresponding to the opening and connected to the sidewall.

23. A display device comprising:
a backlight module, comprising:
a light guide plate having a light exit surface and a backside surface, wherein the light exit surface is opposite to the backside surface;
a bezel arranged at an outer side of the backside surface, the bezel having an inner surface and an outer surface opposite to each other, wherein the inner surface faces the backside surface, and the outer surface has a convex part; and
a piezoelectric module arranged on the convex part and configured to produce a vibration,
wherein the vibration is directly or indirectly transmitted to the bezel to produce a resonance, and a space to which the outer surface oriented is used as a resonance cavity.

24. The display device of claim 23, wherein the convex part has a sidewall; the sidewall is formed with an opening; the piezoelectric module is arranged corresponding to the opening and connected to the sidewall, and the vibration is transmitted to the bezel via the sidewall.

* * * * *